US006245977B1

(12) United States Patent
Byrns

(10) Patent No.: US 6,245,977 B1

(45) Date of Patent: Jun. 12, 2001

(54) PLECTRUM HAVING A PAIR OF CONTACT POINTS

(76) Inventor: Thomas M. Byrns, 17942 Hallcroft, Huntington Beach, CA (US) 92647

(*) Notice: Subject to any disclaimer, the term of this patent is extended or adjusted under 35 U.S.C. 154(b) by 0 days.

(21) Appl. No.: 09/635,035

(22) Filed: Aug. 4, 2000

(51) Int. Cl.[7] .................................................. G01D 3/16

(52) U.S. Cl. ................................ 84/322; 84/320; D17/20

(58) Field of Search ............................ 84/322, 320, 321; D17/20

(56) References Cited

U.S. PATENT DOCUMENTS

| | | | | |
|---|---|---|---|---|
| D. 330,905 | | 11/1992 | Thomas . | |
| D. 356,593 | * | 3/1995 | Purcell | D17/20 |
| 2,481,759 | | 9/1949 | Lawrence . | |
| 2,484,820 | | 10/1949 | Galetzky . | |
| 2,961,912 | | 11/1960 | Meola . | |
| 3,699,838 | * | 10/1972 | Montgomery | 84/322 |
| 4,020,732 | | 5/1977 | Kelly . | |
| 4,253,372 | | 3/1981 | Filipetti . | |
| 6,008,442 | * | 12/1999 | Rendenbach | 84/322 |

* cited by examiner

*Primary Examiner*—Shih-Yung Hsich

(57) ABSTRACT

A plectrum having a pair of contact points for double striking the strings to achieve a fuller sound. The plectrum having a pair of contact points includes a panel. The panel has substantially planar front and back surfaces. The panel has a top edge and two side edges. The side edges taper to an outer point positioned distal of the top edge. The panel has a proximal portion adjacent to the top edge and a distal portion adjacent to the outer point. A slit is in the distal portion. The slit is pointed and has two legs extending away from a point of the slit. The point of the slit is located generally adjacent to the outer point defined by the two side edges. The legs of the slit extend toward the proximal portion. An inner point of the distal portion is defined by the slit. The outer and inner points both strike the strings of an instrument when the plectrum is brought across the strings.

7 Claims, 2 Drawing Sheets

FIG. 1
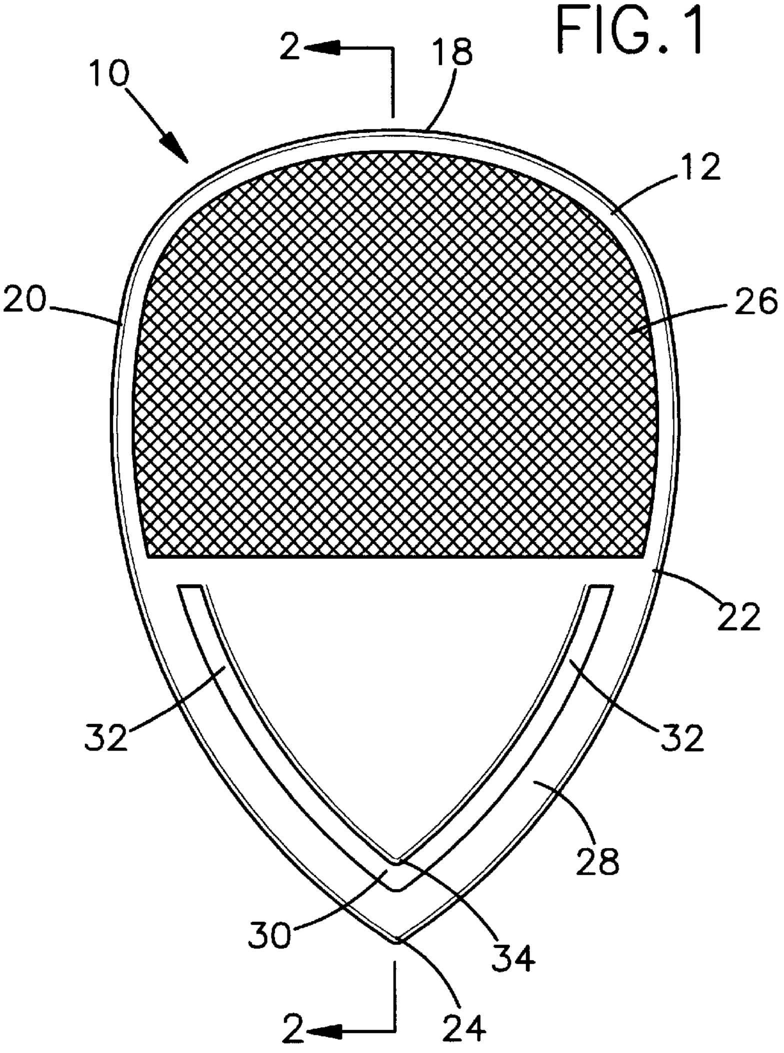
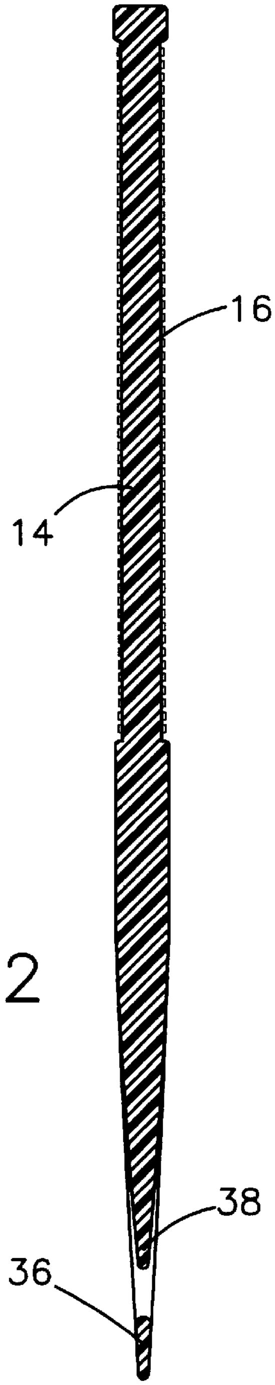
FIG. 2

PLECTRUM HAVING A PAIR OF CONTACT POINTS

BACKGROUND OF THE INVENTION

1. Field of the Invention

The present invention relates to plectrums and more particularly pertains to a new plectrum having a pair of contact points for double striking the strings to achieve a fuller sound.

2. Description of the Prior Art

The use of plectrums is known in the prior art. More specifically, plectrums heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,253,372; U.S. Pat. No. 2,481,759: U.S. Pat. No. 2,484,820; U.S. Pat. No. 4,020,732; U.S. Pat. No. 2,961,912; and U.S. Des. Pat. No. 330,905.

While these devices fulfill their respective, particular objectives and requirements, the aforementioned patents do not disclose a new plectrum having a pair of contact points. The inventive device includes a panel. The panel has substantially planar front and back surfaces. The panel has a top edge and two side edges. The side edges taper to an outer point positioned distal of the top edge. The panel has a proximal portion adjacent to the top edge and a distal portion adjacent to the outer point. A slit is in the distal portion. The slit is pointed and has two legs extending away from a point of the slit. The point of the slit is located generally adjacent to the outer point defined by the two side edges. The legs of the slit extend toward the proximal portion. An inner point of the distal portion is defined by the slit. The outer and inner points both strike the strings of an instrument when the plectrum is brought across the strings.

In these respects, the plectrum having a pair of contact points according to the present invention substantially departs from the conventional concepts and designs of the prior art, and in so doing provides an apparatus primarily developed for the purpose of double striking the strings to achieve a fuller sound.

SUMMARY OF THE INVENTION

In view of the foregoing disadvantages inherent in the known types of plectrums now present in the prior art, the present invention provides a new plectrum having a pair of contact points Construction wherein the same can be utilized for double striking the strings to achieve a fuller sound.

The general purpose of the present invention, which will be described subsequently in greater detail, is to provide a new plectrum having a pair of contact points apparatus and method which has many of the advantages of the plectrums mentioned heretofore and many novel features that result in a new plectrum having a pair of contact points which is not anticipated, rendered obvious, suggested, or even implied by any of the prior art plectrums, either alone or in any combination thereof.

To attain this, the present invention generally comprises a panel. The panel has substantially planar front and back surfaces. The panel has a top edge and two side edges. The side edges taper to an outer point positioned distal of the top edge. The panel has a proximal portion adjacent to the top edge and a distal portion adjacent to the outer point. A slit is in the distal portion. The slit is pointed and has two legs extending away from a point of the slit. The point of the slit is located generally adjacent to the outer point defined by the two side edges. The legs of the slit extend toward the proximal portion. An inner point of the distal portion is defined by the slit. The outer and inner points both strike the strings of an instrument when the plectrum is brought across the strings.

There has thus been outlined, rather broadly, the more important features of the invention in order that the detailed description thereof that follows may be better understood, and in order that the present contribution to the art may be better appreciated. There arc additional features of the invention that will he described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familial with patent or legal terms or phraseology, to determine quickly from a cursory inspection the nature and essence of the technical disclosure of the application. The abstract is neither intended to define the invention of the application, which is measured by the cl aims, nor is it intended to be limiting as to the scope of the invention in any way.

It is therefore an object of the present invention to provide a new plectrum having a pair of contact points apparatus and method which has many of the advantages of the plectrums mentioned heretofore and many novel features that result in a new plectrum having, a pair of contact points which is not anticipated, rendered obvious, suggested, or even implied by any of the prior art plectrums, either alone or in any combination thereof.

It is another object of the present invention to provide a new plectrum having a pair of contact points which may be easily and efficiently manufactured and marketed.

It is a further object of the present invention to provide a new plectrum having a pail- of contact points which is of a durable and reliable construction.

An even further object of the present invention is to provide a new plectrum having a pair of contact points which is susceptible of a low cost of manufacture with regard to both materials and labor, and which accordingly is then susceptible of low prices of sale to the consuming public, thereby making such plectrum having, a pair of contact points economically available to the buying public.

Still yet another object of the present invention is to provide a new plectrum having a pair of contact points which provides in the apparatuses and methods of the prior art some of the advantages thereof, while Simultaneously overcoming some of the disadvantages normally associated therewith.

Still another object of the present invention is to provide a new plectrum having a pair of contact points for double striking the strings to achieve a fuller sound.

Yet another object of the present invention is to provide a new plectrum having a pair of contact points which includes a panel. The panel has substantially planar front and back surfaces. The panel has a top edge and two side edges. The side edges taper to an outer point positioned distal of the top edge. The panel has a proximal portion adjacent to the top edge and a distal portion adjacent to the outer point. A slit is in the distal portion. The slit is pointed and has two legs extending away from a point of the slit. The point of the slit is located generally adjacent to the outer point defined by the two side edges. The legs of the slit extend toward the proximal portion. An inner point of the distal portion is defined by the slit. The outer and inner points both strike the strings of an instrument when the plectrum is brought across the strings.

Still yet another object of the present invention is to provide a new plectrum having a pair of contact points that may be used like conventional plectrums but which allows for a fuller sound by the striking, of each string twice.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic plan view of a new plectrum having a pair of contact points according to the present invention.

FIG. 2 is a schematic side cross-sectional view taken alonge line 2—2 of the present invention.

DESCRIPTION OF THE PREFERRED EMBODIMENT

Figure 3:
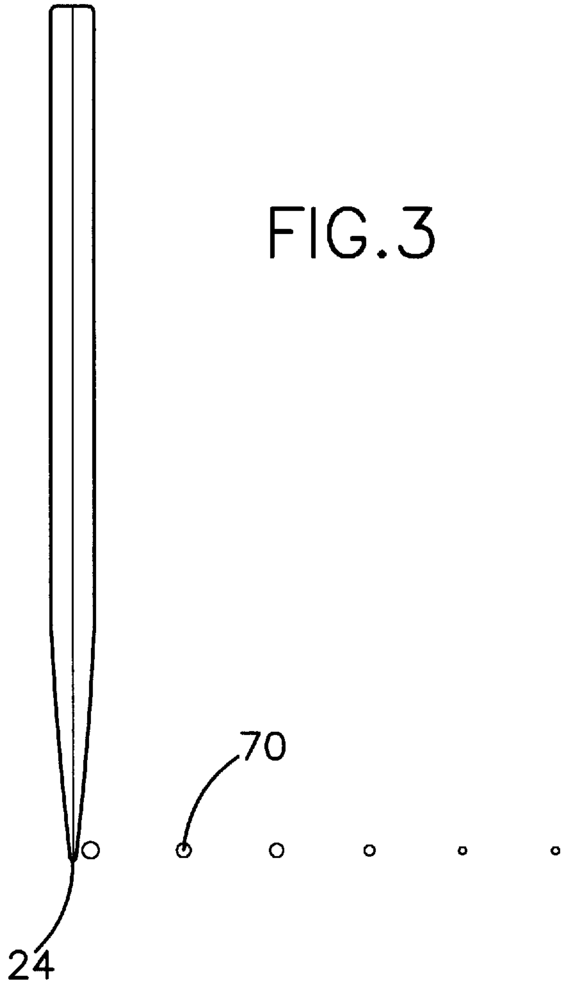
FIG. 3 is a schematic side view of the present invention.

With reference now to the drawings, and in particular to FIG. 1 through 4 thereof, a new plectrum having a pair of contact points embodying the principles and concepts of the present invention and generally designated by the reference numeral 10 will be described.

As best illustrated in FIGS. 1 through 4, the plectrum having, a pair of contact points 10 generally comprises a panel 12. The panel 12 has substantially planar front 14 and back 16 surfaces. The panel 12 has a top edge 18 and two side edges 20, 22. The side edges 20, 22 taper to define an outer point 24 positioned distal of the top edge 18. The panel 12 has a proximal portion 26 adjacent to the top edge 18 and a distal portion 28 adjacent to the outer point 24. A slit 30 is in the distal portion 28. The slit 30 is pointed and has two legs 32 extending away from a point of the slit 30. The slit 30 generally has a V-shape. A point of the slit is located generally adjacent to the outer point 24 defined by the two side edges 20, 22. The legs 32 of the slit extend toward the proximal portion 26. Each of the leas 32 is positioned substantially adjacent to one of the side edges 20, 22. An inner point 34 of the distal portion 28 is defined by the slit 30. The front 14 and back 16 surfaces of the proximal portion 26 are roughened. The top edge of the panel 18 is preferably arced away from the distal portion 28. A thickness of the panel 12 decreases from a junction of the proximal 26 and distal 28 portions to the outer point 24 as depicted in FIG. 2. The panel 12 comprises a resiliently flexible material which is preferably a plastic.

Figure 4:
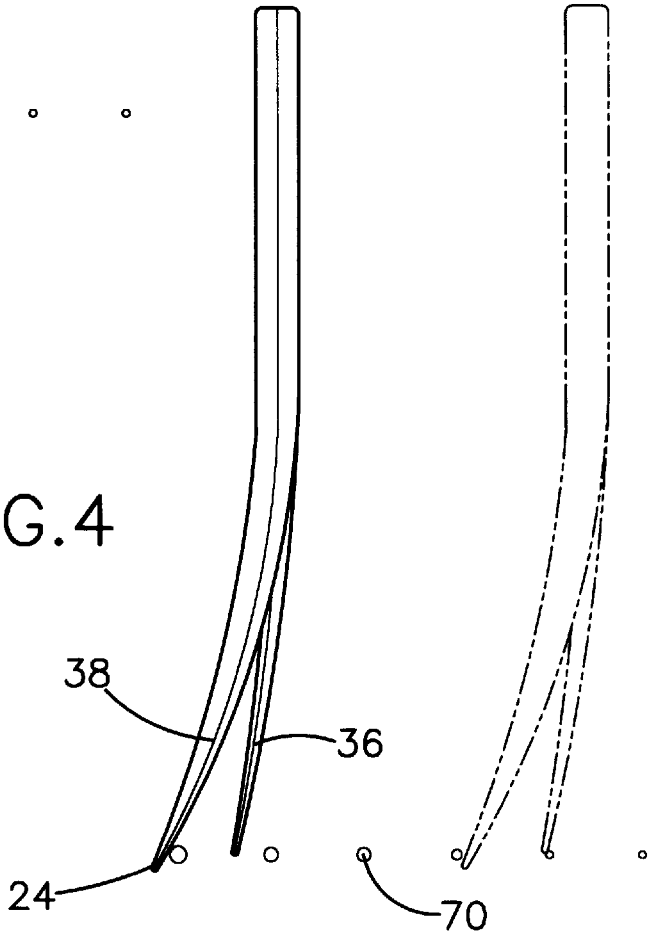
FIG. 4 is a schematic side view of the present invention striking strings of a musical instrument.

In use, the inner point 34 may strike one of the strings 70 while the outer point 24 simultaneously strikes an adjacent string 70 such that each of the strings 70 is struck twice. This happens as depicted in FIGS. 3 and 4. FIG. 3 shows the plectrum 10 before striking the strings 70. When the outer point 24 is placed against the string 70, the plectrum 12 is bent and the inner point 34 is moved to a position outside of the plane of the outer point 24. In essence, an inner portion 36 of the distal portion 28 remains in a straighter orientation than an outer portion 38 of the distal portion 28 when the plectrum 12 is brought across the strings 70. The inner 36 and Outer 38 portions are divided by the slit 30.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A plectrum having a pair of contact points for striking the strings of stringed instrument, said plectrum comprising:

a panel, said panel having substantially planar front and back surfaces, said panel having a top edge and two side edges, said side edges tapering to an outer point positioned distal of said top edge, said panel having a proximal portion adjacent to said top edge and a distal portion adjacent to said outer point, a slit being in said distal portion, said slit being pointed and having two legs extending away from a point of said slit, said point of said slit being located generally adjacent to said outer point, said legs of said slit extending toward said proximal portion, wherein an inner point of said distal portion is defined by said slit.

2. The plectrum m as in claim 1, wherein said panel further comprises:

said slit generally having a V-shape, each of said legs being positioned generally adjacent to one of said side edges.

3. The plectrum as in claim 1, wherein said front and back surfaces of said panel of said proximal portion being roughened.

4. The plectrum as in claim 1, wherein said top edge of said panel is arced.

5. The plectrum as in claim 1, wherein a thickness of said panel decreases from a junction of said proximal and distal portions to said outer point.

6. The plectrum as in claim 1, wherein said panel comprises a resiliently flexible material.

7. A plectrum having a pair of contact points for striking the strings of stringed instrument, said plectrum comprising:

a panel, said panel having substantially planar front and back surfaces, said panel having a top edge and two side edges, said side edges tapering to an outer point positioned distal of said top edge, said panel having a proximal portion adjacent to said top edge and a distal portion adjacent to said outer point, a slit being in said distal portion, said slit being pointed and having two legs extending away from a point of said slit, said slit generally having a V-shape, a point of said slit being located generally adjacent to said outer point, said legs of said slit extending toward said proximal portion, each of said legs being positioned substantially adjacent to one of said side edges, wherein an inner point of said distal portion is defined by said slit, said front and back surfaces of said proximal portion being roughened, said top edge of said panel being arced, a thickness of said panel decreasing from a junction of said proximal and distal portions to said outer point, said panel comprising a resiliently flexible material, said resiliently flexible material comprising a plastic; and wherein said outer and inner points strike each of said strings.

* * * * *